United States Patent Office 3,157,056
Patented Nov. 17, 1964

3,157,056
ENDLESS SPRING BELT ASSEMBLY
Frank P. Gray, 2600 E. Flora Place, and Abe D. Penn,
140 S. Eudora St., both of Denver, Colo.
Filed Sept. 19, 1962, Ser. No. 224,798
9 Claims. (Cl. 74—238)

This invention relates to endless spring belts and, more specifically, to an improved helical spring belt together with a novel connector for splicing the free ends of the belt together in endless relation.

For the past several years, spring belt conveyors have come into increased prominence because of their unique application to difficult material handling problems. These units, of course, consist of several grooved rollers mounted for rotation on a suitable frame and interconnected by a plurality of endless helical spring belts that function as the moving conveyor surface. Conveyors of this type are well known for their versatility in moving material around corners. The delicacy with which the conveyed articles are handled and the suitability of the spring belt principle to accessory items such as, for example, stackers, loaders, bag flatteners, etc.

The instant application is, however, concerned with only an element of such conveyor systems, namely, the endless spring belts themselves. These belts comprise close-wound helical springs with the ends thereof connected or spliced together to form an endless unit. Up to the present time, the splice was accomplished by merely tapering the coils at one of the free ends and screwing this tapered end into the full-size close-wound coils on the other free end. Experience over many years has proven that this method of splicing the ends together, while workable, leaves much to be desired for the simple reason that belt failures almost always take place at the splice. It seems that a splice of this type is considerably stiffer than the remainder of the belt and the continued flexing at the splice which takes place as it passes around the rollers causes premature failure.

It has now been found in accordance with the teaching of the present invention that this and other difficulties can be substantially eliminated by forming the spring so as to include several loose-wound coils at each free end separated by a close-wound mid-portion and then splicing these loose-wound end sections together with a flexible threaded connector having helical grooves on the surface thereof adapted to screw into the loose-wound coils. The resulting endless spring belt has several distinct advantages in that the splice has approximately the same degree of flexibility as the close-wound helix that constitutes the major portion of the belt. Assembly is simplified as well as replacement of worn or broken belts. The spring belts are somewhat easier and less costly to manufacture and the plug-type flexible connectors do not add appreciably to the cost of the spring alone. In the preferred embodiment of the invention, the plugs which are made of rubber contain flexible cord reinforcing fibers to resist elongation thereof while permitting the unit to bend freely. The belt including the spliced ends has a uniform outside diameter that rolls easily in the grooved rollers. The useful life of the belt when compared with those spliced in other ways is much enhanced and, should breakage occur, it will usually take place at the connector meaning, of course, that by merely replacing the plug, the unit can be placed back in service.

It is, therefore, the principal object of the present invention to provide a novel and improved endless spring belt assembly.

A second object is the provision of a device of the class described which results in a more efficient and economical operation of a spring belt conveyor system due to the less frequent necessity of taking the equipment out of service for the replacement of worn and broken belts.

Another object of the invention is to provide an endless spring belt that has a substantially uniform diameter, tension and flexibility throughout its entire length.

Sill another objective is the provision of a plug-type flexible connector that is specifically designed for the purpose of interconnecting the loose-wound coils at the free end of a helical spring together to form an endless belt.

An additional object of the inevntion disclosed herein is to provide a helical spring of constant diameter having a close-wound mid-portion separating loose-wound end-sections.

Further objects are the provision of a helical spring and plug-type flexible connector that cooperates in combination with one another to produce an endless spring belt which is less expensive, more durable, easier to replace, repairable, versatile and decorative.

Other objects will be in part apparent and in part pointed out specifically hereinafter in connection with the description of the drawings which follows, and in which.

Figure 1:
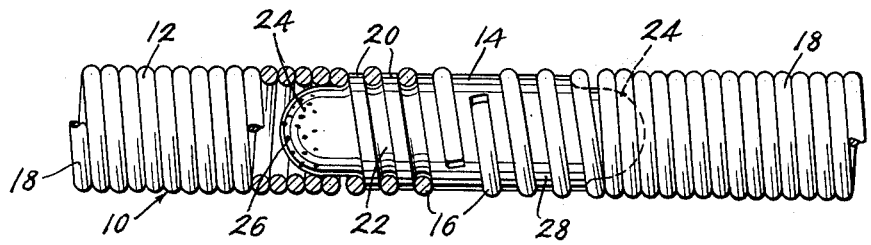
FIGURE 1 is a fragmentary front elevation, portions of which have been broken away and shown in diametrical section, disclosing the loose-wound end sections of a helical spring belt spliced together by means of a flexible plug-type screw-in connector.

Referring now to the drawings for a detailed description of the invention and, initially, to FIGURE 1 for this purpose, the endless spring belt assembly has been designated in a general way by reference numeral 10 and will be seen to comprise a helical spring 12 and a plug type screw-in connector 14 that splices together the free ends 16. The spring is, of course, wound from spring wire and includes a close-wound mid-section 18 in which the individual coils lie in contacting relation to one another except when the unit is under tension. The major portion of the length of the spring is in this close-wound condition and it is only the few coils at each end that are loose-wound as best seen at 16 in FIGURE 5. Note in both FIGURES 1 and 5 that the diameter of both the close and loose-wound coils is substantially the same throughout the entire length of the spring unit.

Figure 5:
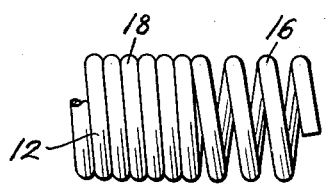
FIGURE 5 is a fragmentary front elevation showing the loose-wound coils on the end of the spring adjoining the close-wound mid-portion thereof.

In FIGURE 5 it can be seen that the spacing between the loose-wound coils in end-section 16 is approximately equal to the diameter of the wire from which the spring is wound. While this is not a particularly critical relationship, a greater spacing may, in some instances, exceed the elastic limits of the wire resulting in an unsatisfactory assembly for purpose of supporting a load on a spring-belt conveyor system. On the other hand, if the space between the loose-wound coils is quite small, the lands 20 that are left between the grooves 22 of the plug will be so narrow as to tear out and let the loose-wound coils slip off the end when the belt is placed under tension. Accordingly, it has been found that a spacing between the loose-wound coils of approximately the diameter of the wire from which the spring is wound obviates the aforementioned difficulties.

Figure 2:
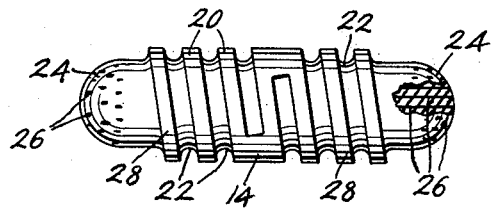
FIGURE 2 is a front elevation showing the plug-type screw-in connector alone.
Figure 4:
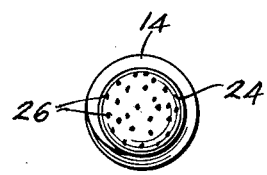
FIGURE 4 is an end view of the connector.
Figure 3:
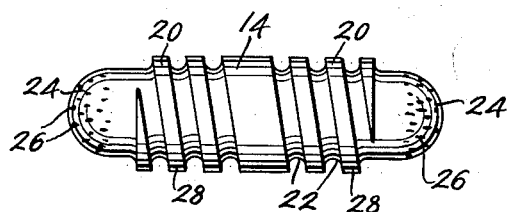
FIGURE 3 is a rear elevation of the connector.

Next, with reference to FIGURES 2, 3 and 4, the plug-type connector 14 will be seen to be generally cylindrical terminating at both ends in hemispherically-shaped portions 24. The major diameter of the plug measured across the lands 20 is preferably just slightly less than the outside diameter of the coil spring so that the plug does not engage the rollers of the spring belt conveyor as the belts turn thereon. This relationship of the major diameters of the plug and spring are best revealed in FIGURE 1.

The plug connector is fabricated from a flexible elastic material, preferably rubber as it must bend in order to pass around the grooved rollers of the spring belt conveyor without producing undue stresses at the splice or lifting adjacent portions of the spring away from the surface of the roller and perhaps causing the belt to slip. In the preferred embodiment of the invention, the plug is impregnated with a plurality of elongate reinforcing fibers 26 that extend from end to end thereof and resist elongation when the belt is under tension, yet which do not inhibit the freedom of the connector to bend.

Threaded sections 28 of the same hand as the loose-wound coils 16 at the extremities of the spring are provided on the cylindrical surface of the connector extending from the hemispherical end portions 24 to approximately the mid-point thereof. In the particular form shown, two separate threaded sections are provided on the surface of the connector, one for each of the spring ends; however, it will be obvious from an examination of FIGURE 2 in particular that a single threaded section extending from end to end would suffice nearly as well in that the threads on both ends are of the same hand.

As shown, the depth of the grooves 22 is slightly greater than the radius of the spring wire and somewhat less than its diameter. Also, the width of the lands 20 corresponds to the spacing between the loose-wound coils which, as has already been mentioned, is roughly equal to the diameter of the wire.

Finally, with particular reference to FIGURES 2 and 5, it should be mentioned that the loose-wound sections 16 of the spring and cooperating threaded sections 28 of the plug should interlock with at least two and preferably three or four complete turns to provide a secure connection that will stand up under the considerable stresses to which the splice is subjected when the belts are loaded. More than four turns on each thread and associated loose-wound coils seem to add little in the way of additional splice strength while, at the same time, making the connector more difficult to thread into the loose-wound spring ends.

Having thus described the several useful and novel features of the spring belt assembly of the present invention it will be apparent that the many worthwhile objectives for which it was developed have been achieved. Although but a single specific embodiment of the invention has been illustrated, we realize that certain modifications may well occur to those skilled in the art within the broad teaching found herein; hence, it is our intention that the scope of protection provided hereby shall be limited only insofar as such limitations are set forth in the appended claims.

What is claimed is:

1. In combination in an endless spring belt, an elongate helical spring of uniform diameter throughout its length having a close-wound mid-section terminating at both ends in spaced coils forming loose-wound end portions, and an elastic plug-type connector having a generally cylindrical shape and a length approximately equal to the combined lengths of the loose-wound portions on the ends of the spring, said connector including at least one thread on each end of the cylindrical surface thereof sized and adapted to receive the loose-wound spring ends and receiving said loose-wound spring ends in an end-to-end non-entwining relation and forming a splice therebetween.

2. The combination as set forth in claim 1 in which the loose-wound portions of the spring include at least two coils.

3. The combination as set forth in claim 1 in which the major diameter of the connector is not greater than the outside diameter of the spring while substantially greater than the inside diameter thereof.

4. The combination as set forth in claim 1 in which each loose-wound end portion comprises not less than two nor more than four coils.

5. The combination as set forth in claim 1 in which the space separating the loose-wound coils is approximately equal to the diameter of the wire from which the spring is formed.

6. The combination as set forth in claim 1 in which the cylindrical surface of the connector includes two threaded sections, one for each loose-wound end portion on the spring ends and substantially equal in length thereto.

7. The combination as set forth in claim 1 in which the depth of the grooves forming the threaded portion of the connector is greater than the radius of the wire from which the spring is wound but less than the diameter thereof.

8. The combination as set forth in claim 1 in which the ends of the connector are hemispherically-shaped.

9. The combination as set forth in claim 1 in which elongate flexible reinforcing fibers are impregnated in the connector extending in the direction of the length thereof.

References Cited in the file of this patent

UNITED STATES PATENTS

| | | |
|---|---|---|
| 1,271,014 | Bower | July 2, 1918 |
| 1,371,513 | Nickerson | Mar. 15, 1921 |
| 1,378,507 | Wiegand | May 17, 1921 |
| 1,983,784 | Watkins et al. | Dec. 11, 1934 |
| 2,234,504 | Robinson et al. | Mar. 11, 1941 |
| 2,260,587 | Shields | Oct. 28, 1941 |
| 2,643,109 | Wood | June 23, 1953 |
| 2,808,609 | Schultz | Oct. 8, 1957 |
| 2,955,065 | Paul | Oct. 4, 1960 |